US006058529A

United States Patent [19]
Goysich

[11] Patent Number: 6,058,529
[45] Date of Patent: May 9, 2000

[54] ENERGY ABSORBING INFANT CAR BED

[76] Inventor: John B. Goysich, 3225 Southern Heights Rd., Tupelo, Miss. 38801

[21] Appl. No.: 09/089,600

[22] Filed: Jun. 2, 1998

[51] Int. Cl.$^7$ ..................................................... A47D 7/04
[52] U.S. Cl. ............................... 5/94; 5/118; 297/216.11; 297/250.1
[58] Field of Search ................................ 5/94, 118, 424, 5/626, 628, 629; 297/250.1, 216.11, 184.13, 184.1

[56] References Cited

U.S. PATENT DOCUMENTS

| | | | |
|---|---|---|---|
| 3,265,438 | 8/1966 | Regan et al. | 297/250.1 X |
| 3,606,457 | 9/1971 | Reay | 5/424 X |
| 3,619,825 | 11/1971 | Toub et al. | 5/94 |
| 3,690,525 | 9/1972 | Koons . | |
| 3,833,946 | 9/1974 | Von Wimmersperg . | |
| 3,833,947 | 9/1974 | Sorensen | 5/94 |
| 4,366,587 | 1/1983 | Takada | 297/216.11 X |
| 4,583,253 | 4/1986 | Hall . | |
| 4,685,740 | 8/1987 | Föhl | 297/216.11 X |
| 4,827,542 | 5/1989 | Kurtenbach | 5/94 X |
| 4,934,004 | 6/1990 | Friedman . | |
| 5,005,234 | 4/1991 | Kelleher et al. . | |
| 5,134,733 | 8/1992 | Wetter et al. . | |
| 5,224,229 | 7/1993 | Smith | 5/94 X |
| 5,292,175 | 3/1994 | Artz | 297/250.1 |

Primary Examiner—Terry Lee Melius
Assistant Examiner—Robert G. Santos
Attorney, Agent, or Firm—Jeffrey L. Thompson; Thompson & Thompson, P.A.

[57] ABSTRACT

An infant car bed for a vehicle comprises a resilient, flexible shell having front, rear, and end portions attached to a bottom portion for transporting a recumbent infant. Front, rear, and end portions include interior and exterior walls which encase a plurality of hollow chambers separated by partitions. Air within the chambers is expelled through the channels when the volume of the chambers is reduced as a result of pressure being exerted upon an exterior wall. Air is drawn back into the chambers when pressure on the wall is relieved to restore the volume of the chamber. The controlled exhaust of air from the chambers absorbs energy from a direct impact with the car bed. Front and rear shell portions further include a recess for securing the car bed to a seat by guiding a seat belt around the front side of the car bed. Straps are mounted to the rear portion of the shell through which a seat belt may be inserted to further secure the car bed to a seat. The straps for securing the car bed to a vehicle seat may be utilized alternatively or in combination.

11 Claims, 8 Drawing Sheets 6,058,529

ENERGY ABSORBING INFANT CAR BED

BACKGROUND OF THE INVENTION

This invention relates to an infant car bed for use in a vehicle and, more particularly to a car bed for protecting an infant from injury by absorbing the energy of an impact to the car bed.

Various car beds for use in vehicles have been proposed in the prior art which propose to protect an infant from injury in the event of a collision or rapid change in speed. Several U.S. patents propose means for pivoting the horizontal base of the car bed into a vertical position upon rapid deceleration indicative of a frontal collision to absorb inertial energy experienced by the infant. See e.g., U.S. Pat. No. 5,134,733 to Wetter, U.S. Pat. No. 3,833,946 to Von Wimmersperg, U.S. Pat. No. 5,005,234 to Kelleher, and U.S. Pat. No. 4,934,004 to Friedman. The bed disclosed by Friedman further absorbs inertial energy through permanent deformation of the bed and shell. In addition, U.S. Pat. No. 4,583,253 to Hall presents an inflatable tubular structure with straps for securing and protecting an infant.

Although assumably effective in operation, such known devices do not adequately protect an infant from side impacts or other invasive collisions. Existing car beds are not designed to withstand a direct impact by the bumper of another vehicle or with parts of the vehicle in which the bed is secured during a crushing impact. Further, such devices do not utilize a resilient construction which can withstand multiple direct impacts. A car bed capable of withstanding a direct vehicle side impact is particularly necessary since most infant car beds or seats are placed immediately adjacent a vehicle door for convenient access to the infant.

Thus, it is desirable to have a car bed for use in a vehicle which reduces the risk of serious bodily injury to an infant by absorbing the energy of a direct impact to the car bed. It is further desirable to have a car bed which may be secured to the seat of a vehicle with conventional seat belts.

SUMMARY OF THE INVENTION

In response thereto, I have invented an infant car bed for use in a vehicle which utilizes a resilient, flexible shell having a bottom wall attached to upstanding side and end portions. Side and end portions include interior and exterior walls which encase a plurality of hollow chambers therein, the chambers being separated by partitions. Air within a chamber is expelled through narrow channels when the volume of a chamber is reduced as a result of pressure being exerted upon the flexible exterior wall. Conversely, air is drawn back into a chamber when pressure on the exterior wall is relieved and the original volume of the chamber is restored. The controlled exhaustion of air from a chamber absorbs energy from a direct impact to the car bed.

The infant car bed provides at least two means for attaching the car bed to the seat of an automobile using existing seat belts. First, the exterior wall of the front and rear shell portions includes a recess substantially the width of a conventional seat belt for guiding an existing seat belt around the front of the car bed. Alternatively, the car bed may be secured by inserting existing seat belts through a pair of straps mounted on the rear portion.

It is therefore a general object of this invention to provide a car bed for safely transporting an infant in a vehicle.

Another object of this invention is to provide a car bed, as aforesaid, which can absorb the energy of a direct impact by expelling air from hollow chambers encased within its walls upon impact.

Still another object of this invention is to provide a car bed, as aforesaid, which can be secured to the seat of a vehicle with existing seat belts.

A further object of this invention is to provide a car bed, as aforesaid, having two layers of energy-absorbing flexible material for the comfort and protection of an infant.

A still further object of this invention is to provide a car bed, as aforesaid, having a canopy which can protect an infant from collision debris and from a direct topside impact.

Yet another object of this invention is to provide a car bed, as aforesaid, having a canopy which can be selectably positioned to shade an infant.

A particular object of this invention is to provide a car bed, as aforesaid, which includes a pair of handles for carrying the car bed when not in use in a vehicle.

Another particular object of this invention is to provide a car bed, as aforesaid, which provides convenient storage of infant care items.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
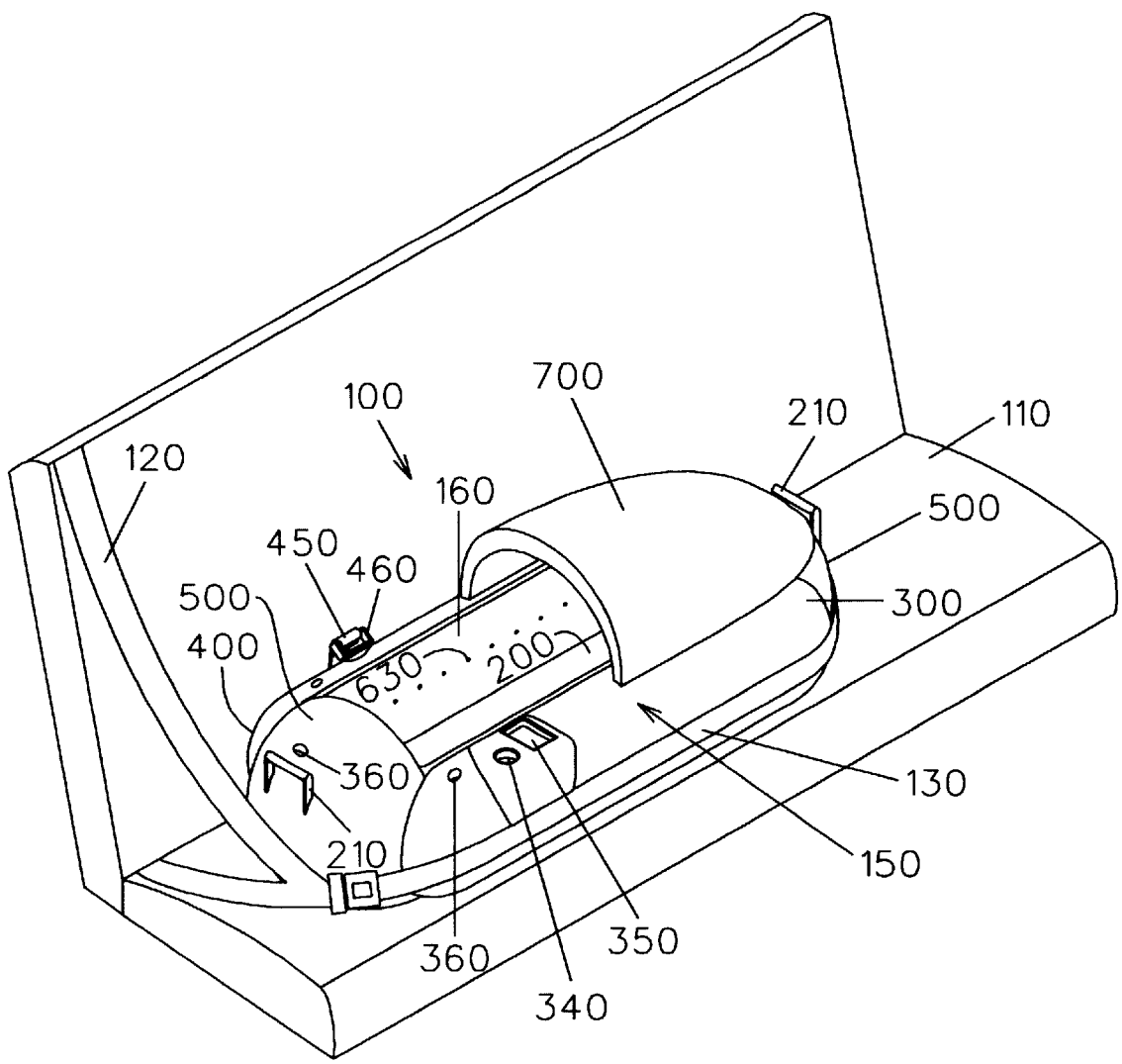
FIG. 1 is a perspective view of the infant car bed attached to a vehicle seat with a seat belt.

Turning more particularly to the drawings, FIG. 1 shows the infant car bed 100 positioned crosswise across a vehicle seat 110 and secured thereto with a vehicle seat belt 120, the method of securing the car bed to be subsequently described. As shown more particularly in FIGS. 1–3, the car bed 100 comprises a generally tube-like shell 150 preferably made of molded polyvinyl chloride (PVC) foam or polyester foam which is resilient and fire resistant.

The shell 150 includes an interior compartment with openings formed by a bottom wall 200 (FIG. 3) for supporting a recumbent infant, oppositely disposed front and rear portions 300, 400 (FIGS. 2A and 2B) with spaced apart side or end portions 500 intermediate the front and rear portions 300, 400. The front, rear, and end portions 300, 400, 500 are integrally joined to the bottom wall 200 at lower ends 170 thereof, front and rear portions 300, 400 being further integrally joined to end portions 500 at opposing ends 310 thereof. See FIGS. 3 and 8. Front, rear, and end portions 300, 400, 500 include generally convex exterior walls 320, 410, 510, respectively, which are integrally attached to a single interior wall 160 (FIG. 7), the interior wall 160 being normal about the perimeter of bottom wall 200. A handle 210 is fixedly attached to the exterior walls 510 of each end shell portion 500 for carrying the car bed 100 when not in use in a vehicle. See FIG. 3.

Figure 7:
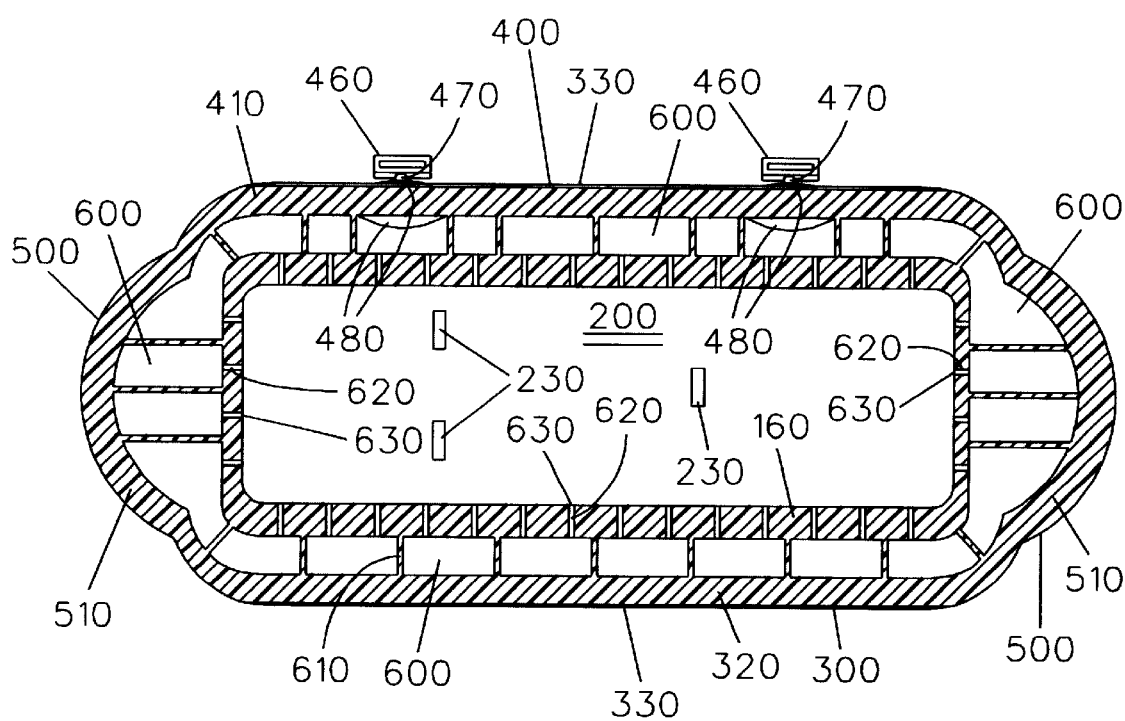
FIG. 7 is a sectional view of the infant car bed taken along plane 7—7 of FIG. 2A.
Figure 8:
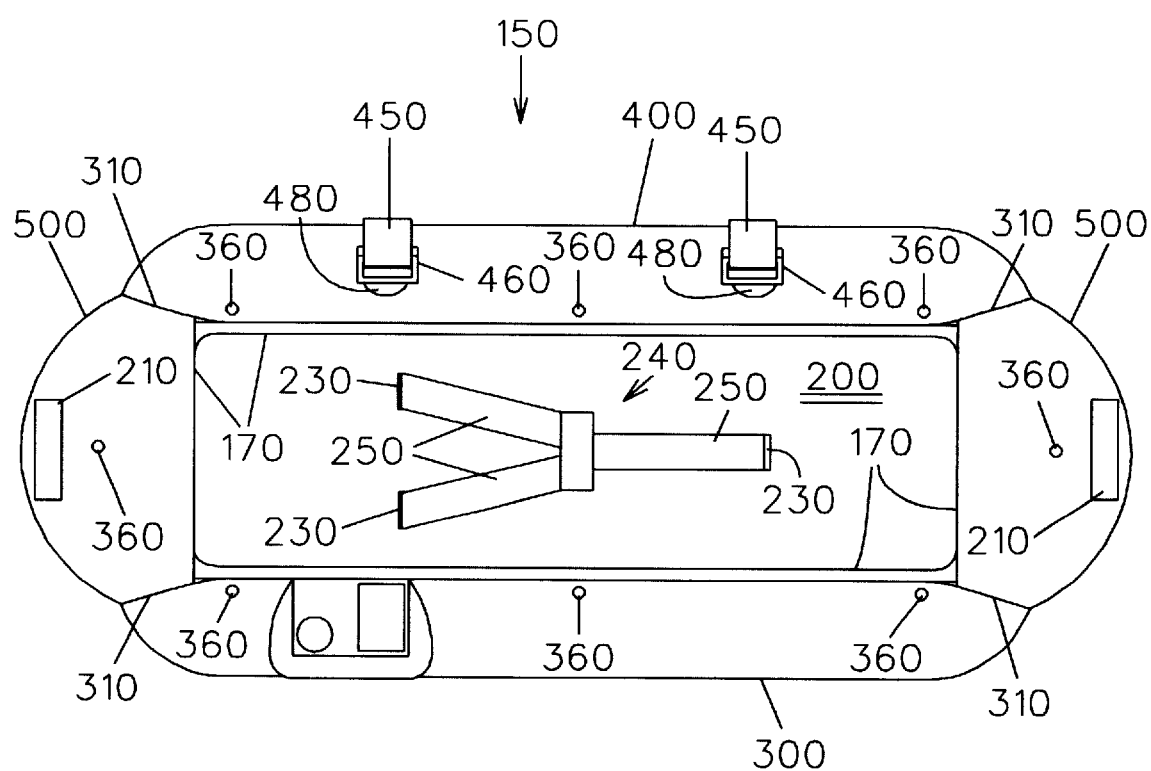
FIG. 8 is a top view of the infant car bed with the canopy removed.

As shown in FIG. 7, a plurality of hollow chambers 600 are encased within front, rear, and end portions 300, 400, 500, each chamber 600 being separated by a semi-rigid partition 610. At least one channel 620 extends between each chamber 600 and wall 160 to present an outlet aperture 630 in the interior wall 160, through which air is expelled from the corresponding chamber 600 when the volume of the respective chamber 600 is reduced due to the exertion of pressure on a section of the exterior wall immediately adjacent the respective chamber 600. Conversely, air enters the respective chamber 600 through aperture 630 when pressure on the particular wall section is relieved. Thus, the original volume of the chamber is restored.

The exhaust of air through channels 620 upon an impact to a section of the exterior walls 320, 410, 510 of the car bed 100 results in a reduction of the impact energy experienced by the interior wall 160 and thus to an infant within the car bed. It is understood that the "crushability" or rate at which air is expelled from one chamber from an impacted chamber or chambers is dependent upon the size of the channels 620 and outlet apertures 630. The partitions 610 may also present apertures through which air may be expelled into adjacent chambers 600 upon impact.

Figure 2A:
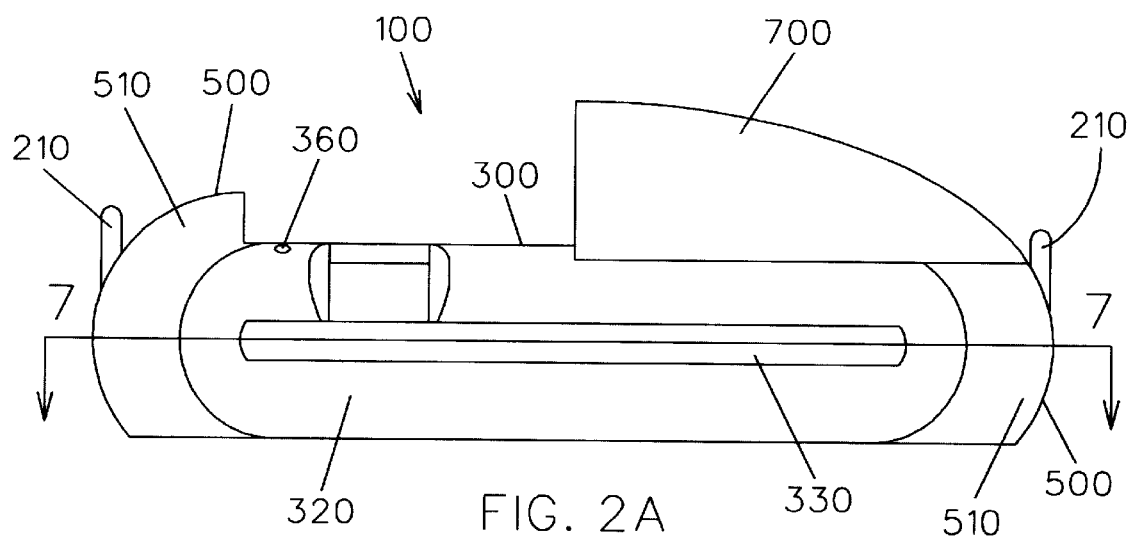
FIG. 2A is a front view of the infant car bed of FIG. 1.
Figure 2B:
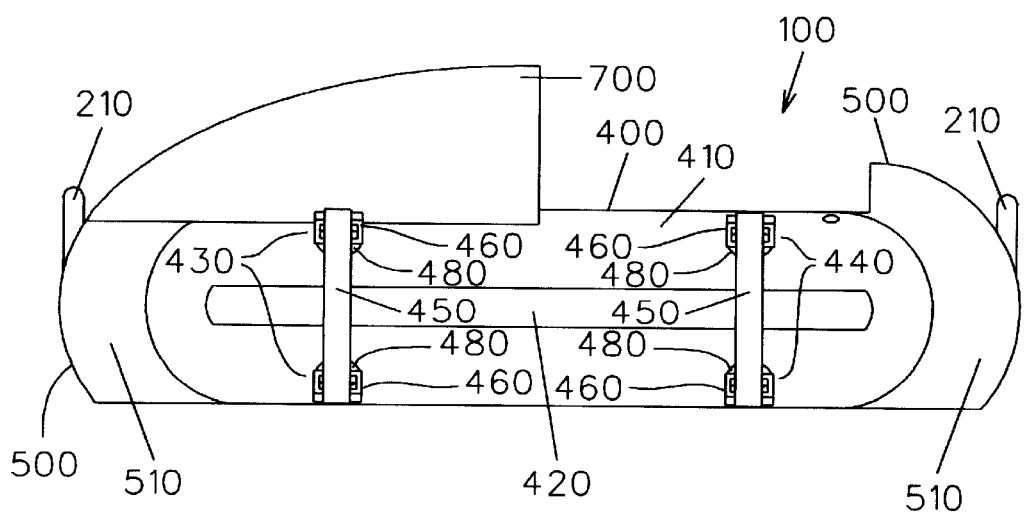
FIG. 2B is a rear view of the infant car bed of FIG. 1.
Figure 5A:
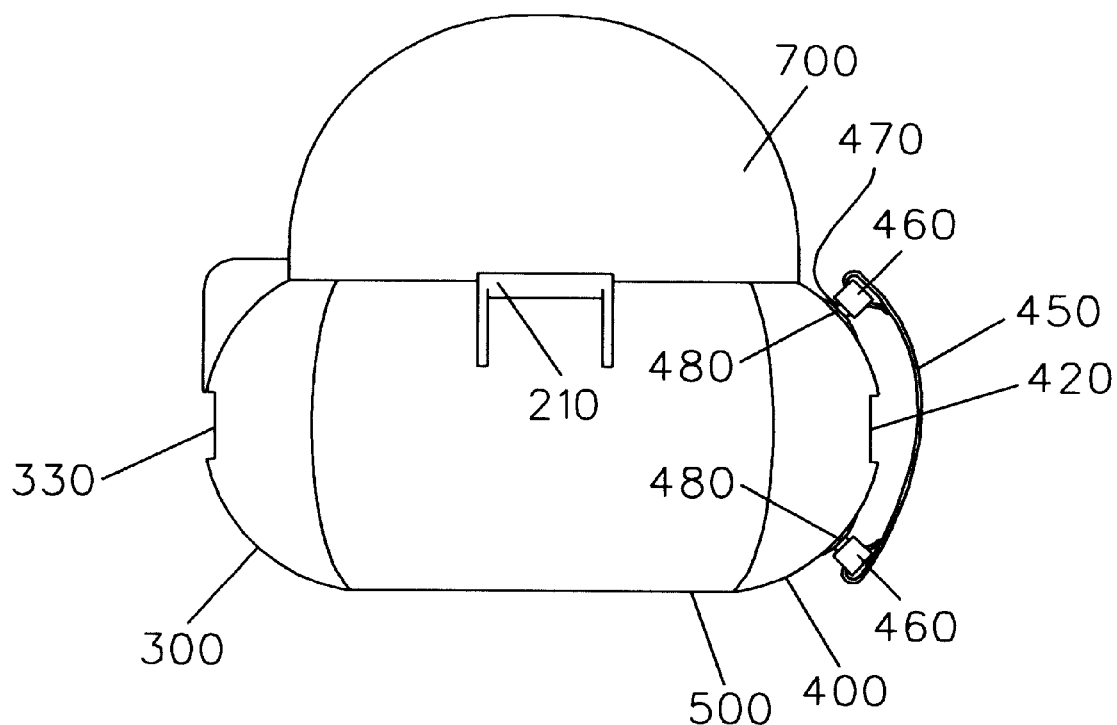
FIG. 5A is a right side view of the infant car bed of FIG. 2A.
Figure 5B:
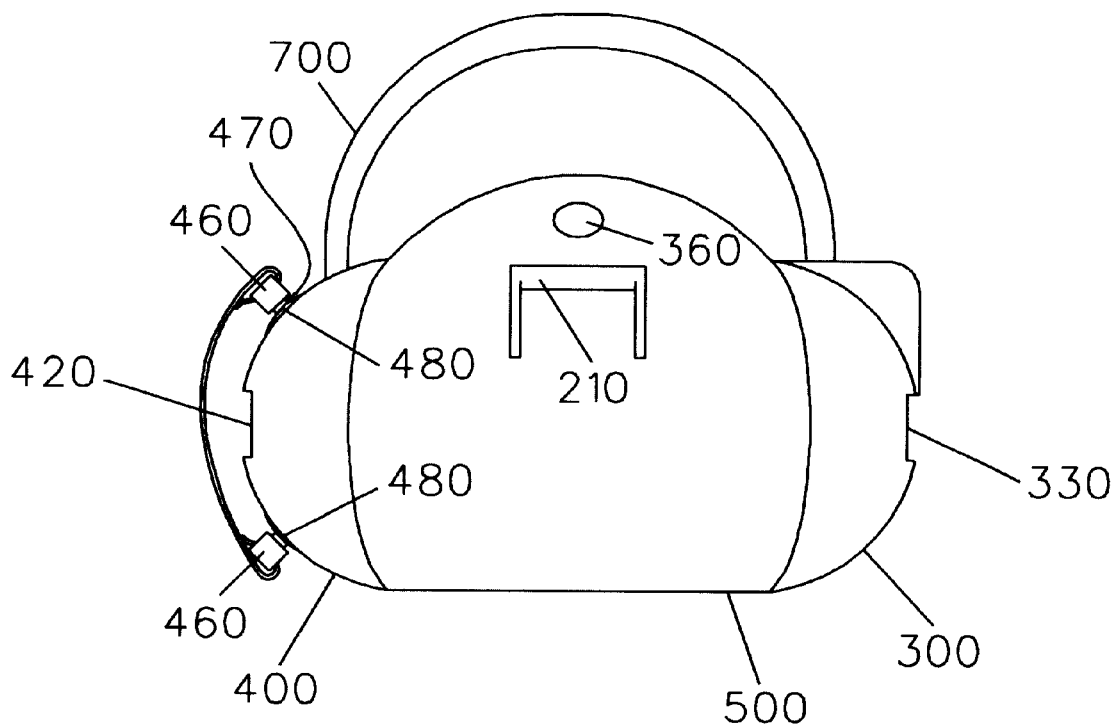
FIG. 5B is a left side view of the infant car bed of FIG. 2A.

As shown in FIG. 2A, the exterior wall 320 of the front portion 300 includes a recess 330 extending substantially the length of the exterior wall 320, the recess 330 being slightly wider and deeper than the width and thickness, respectively, of a conventional seat belt. The recess 330 is preferably disposed slightly above the center of gravity of the car bed 100 as a whole such that upon securing the bed 100 will be maintained atop the vehicle seat during an impact. Accordingly, as seen in FIG. 1, a vehicle seat belt 120 may be guided by and seated within the recess 330 while being wrapped around the front of the car bed 100, possibly in connection with an extension belt 130 of the type known in the art, and secured to a buckle near the opposing end of the car bed 100. While foam construction of the shell 150 allows tight seat belt adjustment to secure the car bed 100, the exterior walls and chambers should not be unduly compressed by excessive tightening. The exterior wall 410 of the rear portion 400 includes an elongated recess 420 of identical construction as recess 330, allowing the rear portion 400 to be frontwardly oriented and secured as described earlier. The exterior wall 410 further includes laterally spaced apart first and second pairs of D-rings 430, 440 or other similar fasteners, each pair 430, 440 being vertically aligned for receiving opposing ends of a strap 450 extending therebetween and being fixedly attached thereto. More specifically, as seen in FIGS. 5A, 5B and 7, each fastener 460 is fixedly attached to a flange 470 which, in turn, is fixedly attached to the exterior wall 410 of the rear portion 400 by rivet 480. In use, a seat belt 120 may be inserted between the rear portion 400 and the straps 450 to engage a seat belt buckle for securing the car bed 100 to a seat 110. It is understood that the front and rear seat belt attachment means may be used alternatively or in combination.

Figure 3:
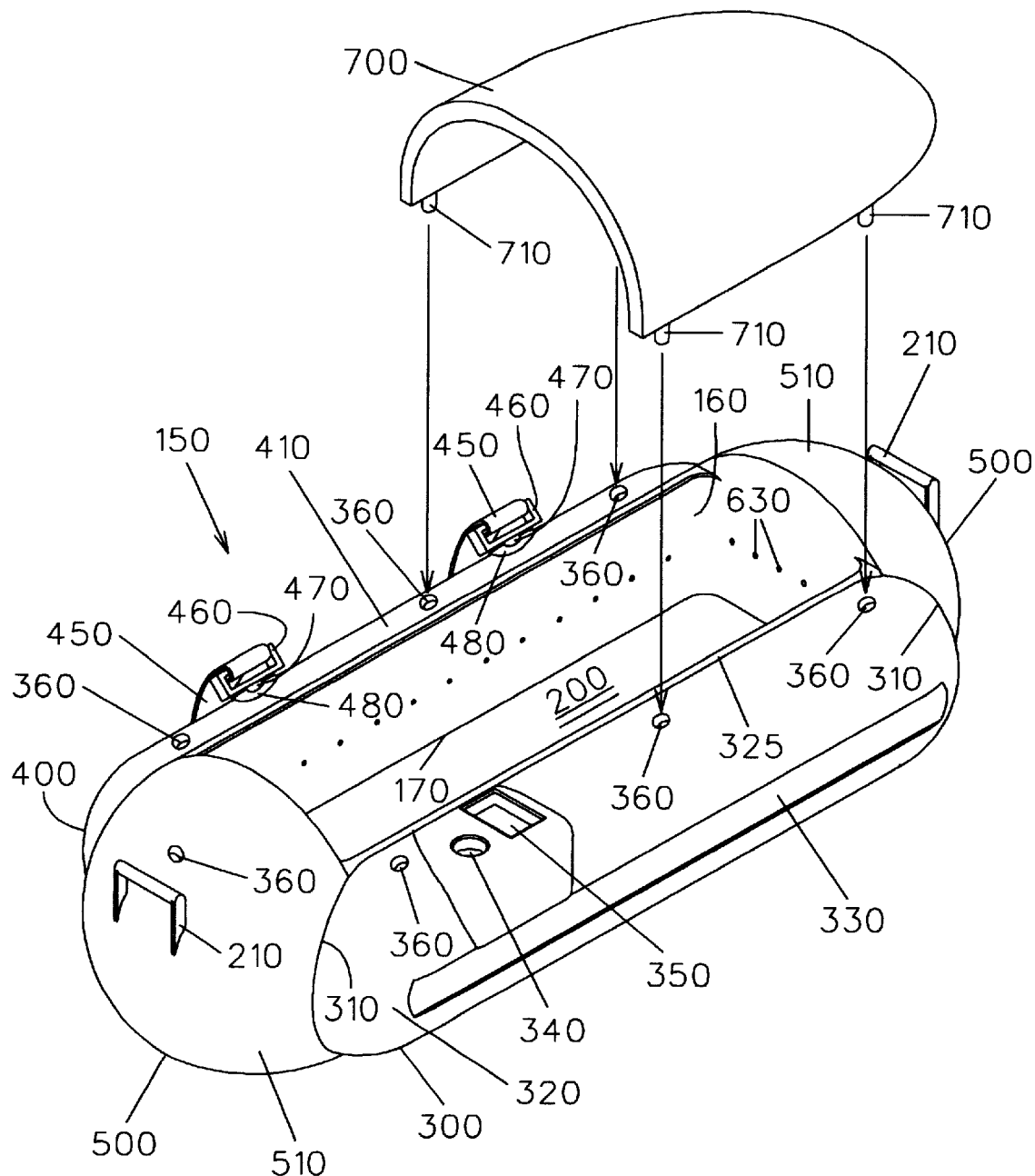
FIG. 3 is an exploded perspective view of the infant car bed with the canopy removed from the position shown in FIG. 1.
Figure 4:
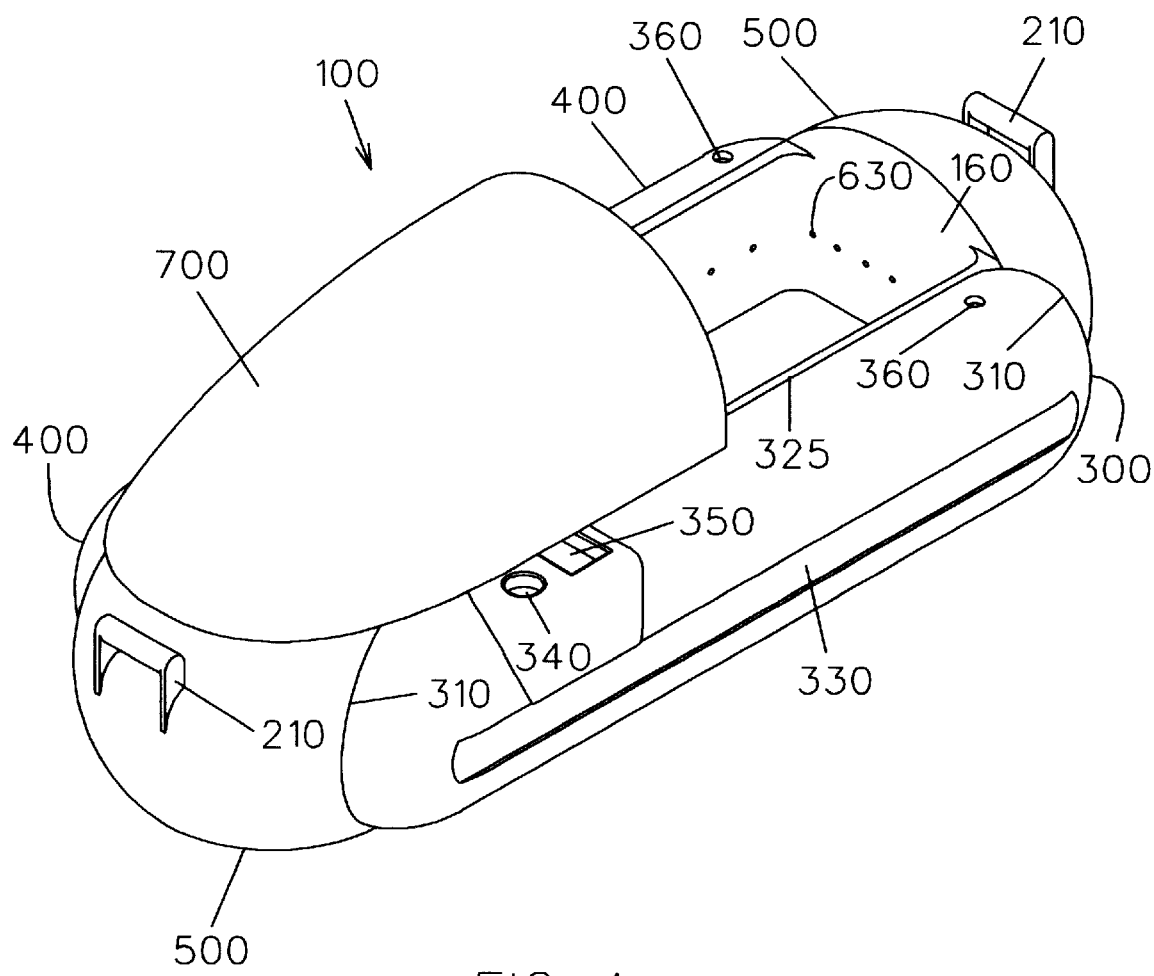
FIG. 4 is a perspective view of the infant car bed with the canopy attached in a second position.

As best seen in FIG. 3, the car bed 100 further includes a generally hemispherical canopy 700 having flanges 710 integrally joined to lower ends thereof, the flanges 710 being insertably mounted to shell portions 300, 400, 500 through spaced apart apertures 360 presented therein. The canopy 700 is preferably made of the same foam material as the shell 150 for protecting an infant from collision debris or from a direct topside impact. Flanges 710 and apertures 360 are symmetrically positioned for selectively positioning the canopy 700 on either end of the car bed for shading an infant from the sun.

Figure 6A:
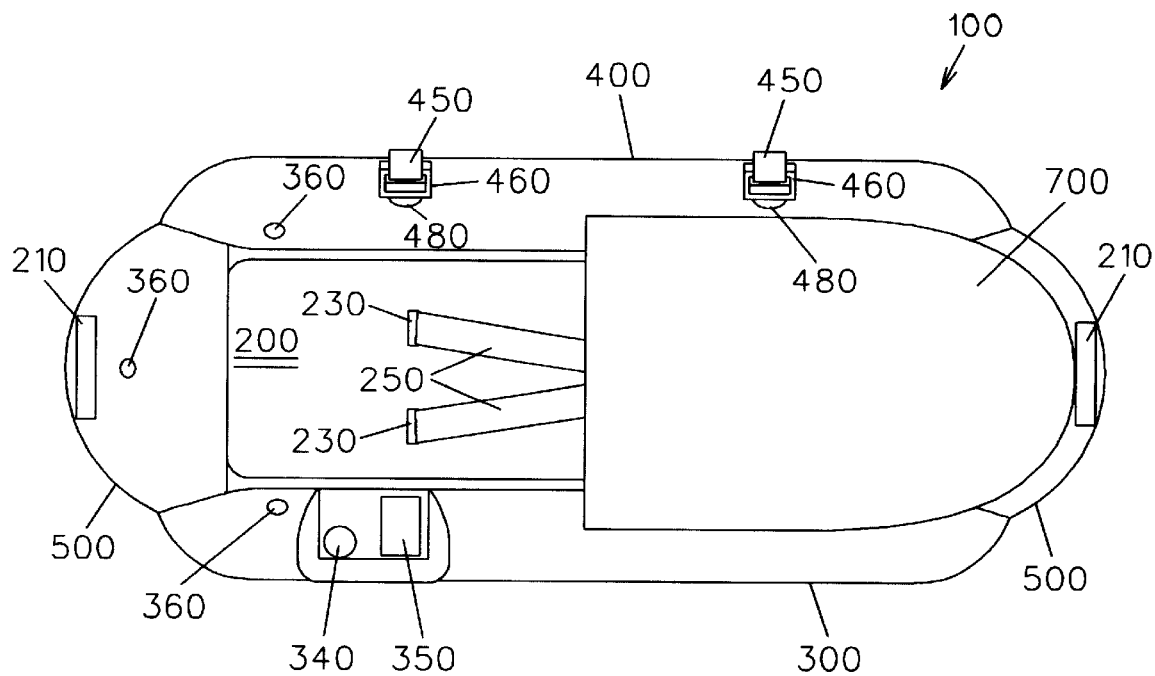
FIG. 6A is a top view of the infant car bed of FIG. 2A.
Figure 6B:
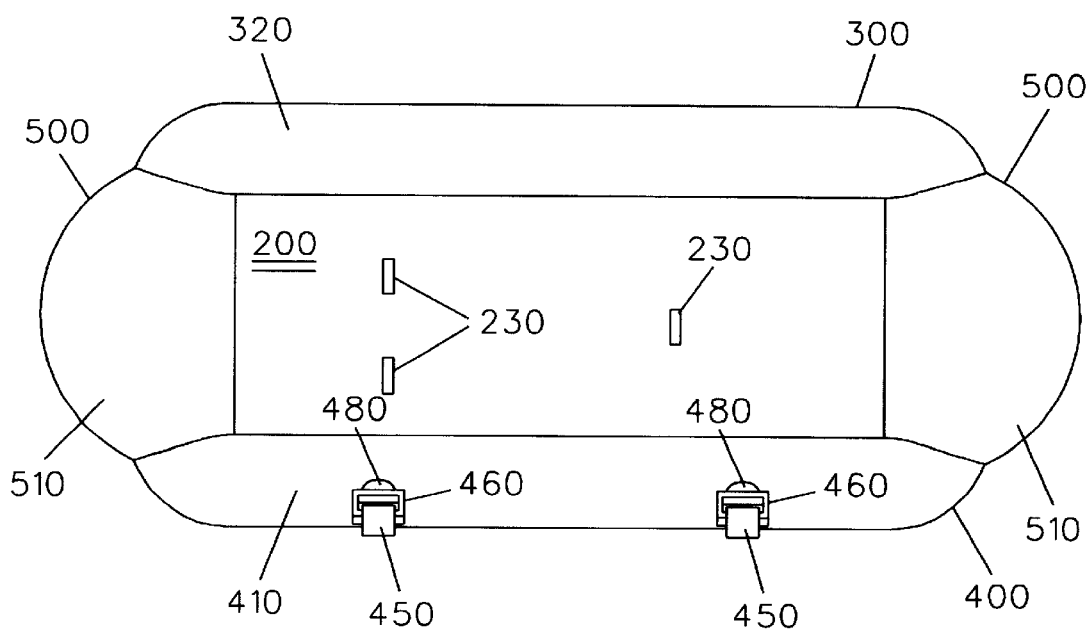
FIG. 6B is a bottom view of the infant car bed of FIG. 2A.

Also as shown in FIG. 3, the exterior wall 320 of the front portion 300 further includes a bore 340 and recess 350 near an upper end 325 thereof for holding a baby bottle and other baby care items. As shown in FIGS. 6A–7, the bottom wall 200 presents slots 230 for receiving the straps 240 of an infant seat belt 250 therethrough, preferably a three-point harness type belt which is known in the art.

Accordingly, it can be seen that the infant car bed can reduce the risk of serious injury to an infant in a vehicle by expelling air from hollow chambers within the car bed walls and thus absorbing the energy of a direct impact. Further, the infant car bed can be securely fastened to a vehicle seat with existing seat belts.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. An infant car bed, comprising:
   a shell having a bottom support wall, spaced apart front and rear walls and spaced apart side walls, to form a compartment with an opening in said shell for placement of an infant therein;
   said front, rear and side walls each having an inner surface spaced apart from an exterior surface, said surfaces joined together by a plurality of partitions spaced apart to form air chambers therebetween; and
   at least one channel extending between each of said air chambers and said corresponding inner surface of said chamber, said at least one channel adapted to expel air from within said corresponding chamber when pressure is exerted on said exterior surface of said chamber, said at least one channel adapted to intake air when the pressure on said exterior surface is relieved.

2. An infant car bed as claimed in claim 1, further comprising:
   a carrying handle mounted on each said side wall of said shell.

3. An infant car bed as claimed in claim 1, further comprising:
   a canopy removably mounted to said shell over said opening, said canopy adapted to shade an infant in said opening.

4. An infant car bed as claimed in claim 3 further comprising means on said shell for selectably mounting said canopy to said shell at opposed ends of said opening.

5. An infant car bed as claimed in claim 1, further comprising:
   a seat belt groove formed in said front wall of said shell, said groove adapted to receive a seat belt therein for securing said bed to a car seat.

6. An infant car bed as claimed in claim 1, further comprising:
   a seat belt groove formed in said rear wall of said shell, said groove in said rear wall adapted to receive a seat belt therein.

7. An infant car bed as claimed in claim 1, further comprising:
   a pair of seat belt straps spaced apart and mounted on said rear wall of said shell, said straps adapted to receive a seat belt therethrough for securing said bed to a car seat.

8. An infant car bed as claimed in claim 1 wherein said shell is resiliently deformable.

9. An infant car bed, comprising:
- a resiliently deformable shell having a compartment formed therein, said compartment presenting an opening for placement and removal of a resting infant therein;
- said shell having an inner wall spaced apart from an exterior wall;
- a plurality of spaced apart partitions extending between said walls to form a plurality of air chambers;
- a channel extending from each air chamber of said plurality of air chambers and vented outside said shell, each said channel adapted to expel air from one of said chambers when pressure is exerted on said exterior wall and adapted to intake air when the pressure is relieved from said exterior wall;
- a seat belt groove formed in said exterior wall of said shell adapted for receiving a first seat belt therein to secure said bed to a car seat.

10. An infant car bed as claimed in claim 9 further comprising:
- a pair of seat belt straps mounted on said shell for receiving a second seat belt therethrough to secure said bed to a car seat.

11. An infant car bed as claimed in claim 9 further comprising an aperture in said partitions for communicating adjacent chambers of said plurality of apertures.

* * * * *